US012613940B2

(12) United States Patent
Pandamaneti et al.

(10) Patent No.: US 12,613,940 B2
(45) Date of Patent: Apr. 28, 2026

(54) CLUSTERING-BASED DEVIATION PATTERN RECOGNITION

(71) Applicant: Capital One Services, LLC, McLean, VA (US)

(72) Inventors: Komal Krishna Pandamaneti, Frisco, TX (US); Lewis C. Wong, Dallas, TX (US); Dinesh Vajala, Plano, TX (US); Sunil Lawrence, Little Elm, TX (US); Jason E. Lines, Prosper, TX (US); Stephen Michael Lipner-Bernstein, Frisco, TX (US); Sriram Ganta, McKinney, TX (US); Siva R. Vegesana, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 138 days.

(21) Appl. No.: 18/466,491

(22) Filed: Sep. 13, 2023

(65) Prior Publication Data

US 2025/0086253 A1    Mar. 13, 2025

(51) Int. Cl.
*G06F 18/2325*        (2023.01)

(52) U.S. Cl.
CPC ................................. *G06F 18/2325* (2023.01)

(58) Field of Classification Search
CPC .................................................. G06F 18/2325
See application file for complete search history.

(56) References Cited

U.S. PATENT DOCUMENTS

| | | | | |
|---|---|---|---|---|
| 7,076,462 | B1 * | 7/2006 | Nelson | G06Q 40/03 |
| | | | | 705/38 |
| 7,480,631 | B1 * | 1/2009 | Merced | G06Q 40/00 |
| | | | | 235/380 |
| 8,903,741 | B2 * | 12/2014 | Imrey | G06Q 40/00 |
| | | | | 705/38 |
| 10,929,925 | B1 * | 2/2021 | Hunt, III | G06Q 50/182 |
| 12,033,211 | B1 * | 7/2024 | Bergida | G06F 16/2365 |
| 2013/0173449 | A1 * | 7/2013 | Ng | G06Q 50/182 |
| | | | | 705/38 |
| 2019/0043125 | A1 * | 2/2019 | Cropper | G06F 40/247 |
| 2019/0164159 | A1 * | 5/2019 | Ponniah | G06N 20/00 |
| 2021/0374753 | A1 * | 12/2021 | Kramme | G06Q 20/4016 |
| 2021/0374764 | A1 * | 12/2021 | Kramme | G06Q 20/24 |
| 2022/0230174 | A1 * | 7/2022 | Khare | H04L 9/3297 |
| 2023/0079513 | A1 * | 3/2023 | Kohoutek | G06F 18/214 |
| | | | | 705/44 |
| 2023/0306503 | A1 * | 9/2023 | Dadhich | G06N 3/123 |
| 2024/0378377 | A1 * | 11/2024 | Katzin | G06F 40/186 |
| 2025/0014041 | A1 * | 1/2025 | Pawar | G06Q 20/382 |

* cited by examiner

*Primary Examiner* — Paul S Schwarzenberg
(74) *Attorney, Agent, or Firm* — Harrity & Harrity, LLP

(57)        ABSTRACT

In some implementations, a device may obtain first data associated with one or more accounts. The device may process the first data to obtain clustering information associated with the first data. The device may cluster the first data into one or more clusters based on the clustering information. The device may identify, via a second machine learning model, one or more deviation patterns associated with a portion of the first data that is included in a cluster of the one or more clusters. The device may determine, for the cluster, one or more operations to be performed to mitigate deviations based on the one or more deviation patterns. The device may perform an action, that is based on the one or more operations, associated with second data grouped into the cluster.

20 Claims, 9 Drawing Sheets

100

Data Sources

Dispute Data

Account Data (source data)

Compliance Data

Calculated Data

105
Input data

110
Process, via a first machine learning model, the input data

115
Cluster the input data into one or more deviation clusters

Compliance Device

100

Input data for a cluster

Second Machine Learning Model

Deviation pattern(s) for the cluster

120

Determine, via a second machine learning model, one or more deviation patterns associated with respective clusters Compliance Device

125

Determine, based on the one or more deviation patterns, one or more corrective operations associated with respective clusters

100

145
Detect a deviation associated with additional input data

150
Perform an action in response to detecting the deviation

Compliance Device

140
Cluster, based on an output of the first machine learning model, the additional input data into one or more clusters

100

Client Device

Server Device

165
Modified data

160
Notification of the
deviation

155
Perform, using the data,
one or more corrective
operations associated with
the cluster Compliance Device

300

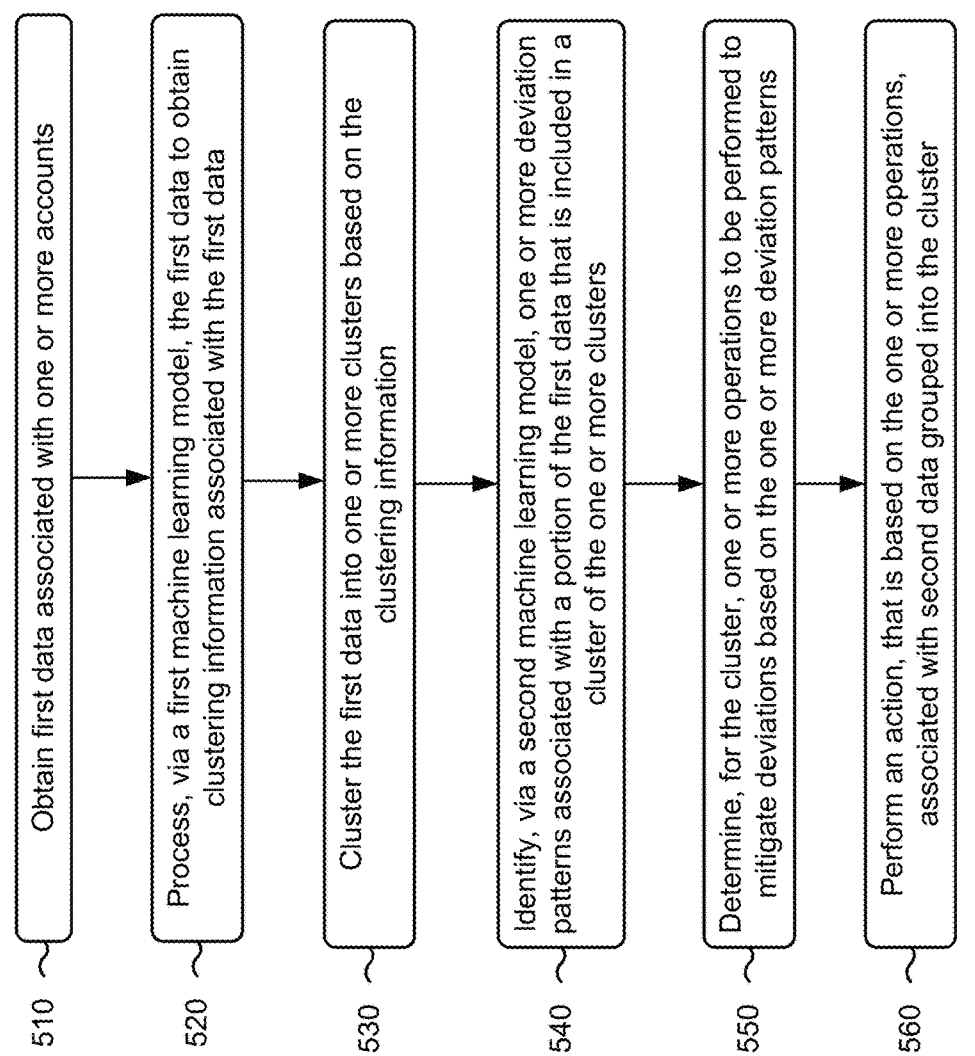

510 — Obtain first data associated with one or more accounts

520 — Process, via a first machine learning model, the first data to obtain clustering information associated with the first data 530 — Cluster the first data into one or more clusters based on the clustering information 540 — Identify, via a second machine learning model, one or more deviation patterns associated with a portion of the first data that is included in a cluster of the one or more clusters 550 — Determine, for the cluster, one or more operations to be performed to mitigate deviations based on the one or more deviation patterns 560 — Perform an action, that is based on the one or more operations, associated with second data grouped into the cluster

CLUSTERING-BASED DEVIATION PATTERN RECOGNITION

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

SUMMARY

Some implementations described herein relate to a system for clustering-based deviation pattern recognition. The system may include one or more memories and one or more processors communicatively coupled to the one or more memories. The one or more processors may be configured to obtain first data associated with one or more accounts, wherein the first data includes at least one of disputed data, compliance rule data, account data, or calculated data. The one or more processors may be configured to process, using a machine learning model, the first data to obtain vector quantization information associated with the first data. The one or more processors may be configured to cluster the first data into one or more clusters based on the vector quantization information, wherein the one or more clusters are indicative of respective types of deviations from at least one of one or more compliance rules indicated by the compliance rule data or one or more calculation rules. The one or more processors may be configured to determine, for a cluster of the one or more clusters, one or more operations to be performed to mitigate a deviation type associated with the cluster based on a root cause analysis associated with the deviation type. The one or more processors may be configured to cluster, based on a first output of the machine learning model, second data into the cluster. The one or more processors may be configured to perform, based on the second data being clustered into the cluster, the one or more operations on the second data to generate modified data. The one or more processors may be configured to transmit, to a server device, the modified data.

Some implementations described herein relate to a method for clustering-based deviation pattern recognition. The method may include obtaining, by a device, first data associated with one or more accounts. The method may include processing, by the device via a first machine learning model, the first data to obtain clustering information associated with the first data. The method may include clustering, by the device, the first data into one or more clusters based on the clustering information, wherein the one or more clusters associated with respective types of deviations from one or more compliance rules indicated by compliance data. The method may include identifying, by the device and via a second machine learning model, one or more deviation patterns associated with a portion of the first data that is included in a cluster of the one or more clusters, wherein the one or more deviation patterns are based on the portion of the first data, the compliance data, and source data associated with the one or more accounts. The method may include determining, by the device and for the cluster, one or more operations to be performed to mitigate deviations based on the one or more deviation patterns. The method may include performing, by the device, an action, that is based on the one or more operations, associated with second data grouped into the cluster.

Some implementations described herein relate to a non-transitory computer-readable medium that stores a set of instructions. The set of instructions, when executed by one or more processors of a device, may cause the device to obtain first data associated with one or more accounts, wherein the first data includes at least one of disputed data, compliance rule data, account data, or calculated data. The set of instructions, when executed by one or more processors of the device, may cause the device to process, using a machine learning model, the first data to obtain vector quantization information associated with the first data. The set of instructions, when executed by one or more processors of the device, may cause the device to cluster the first data into one or more clusters based on the vector quantization information, wherein the one or more clusters are indicative of respective types of deviations from at least one of one or more compliance rules indicated by the compliance rule data or one or more calculation rules. The set of instructions, when executed by one or more processors of the device, may cause the device to determine, for a cluster of the one or more clusters, one or more operations to be performed to mitigate the deviation based on a root cause analysis associated with the deviation. The set of instructions, when executed by one or more processors of the device, may cause the device to cluster, based on a first output of the machine learning model, second data into the cluster. The set of instructions, when executed by one or more processors of the device, may cause the device to perform, based on the second data being clustered into the cluster, the one or more operations to the second data to generate modified data. The set of instructions, when executed by one or more processors of the device, may cause the device to transmit, to a server device, the modified data.

BRIEF DESCRIPTION OF THE DRAWINGS

FIG. 5 is a flowchart of an example process associated with clustering-based deviation pattern recognition, in accordance with some embodiments of the present disclosure.

DETAILED DESCRIPTION

Figure 1A:
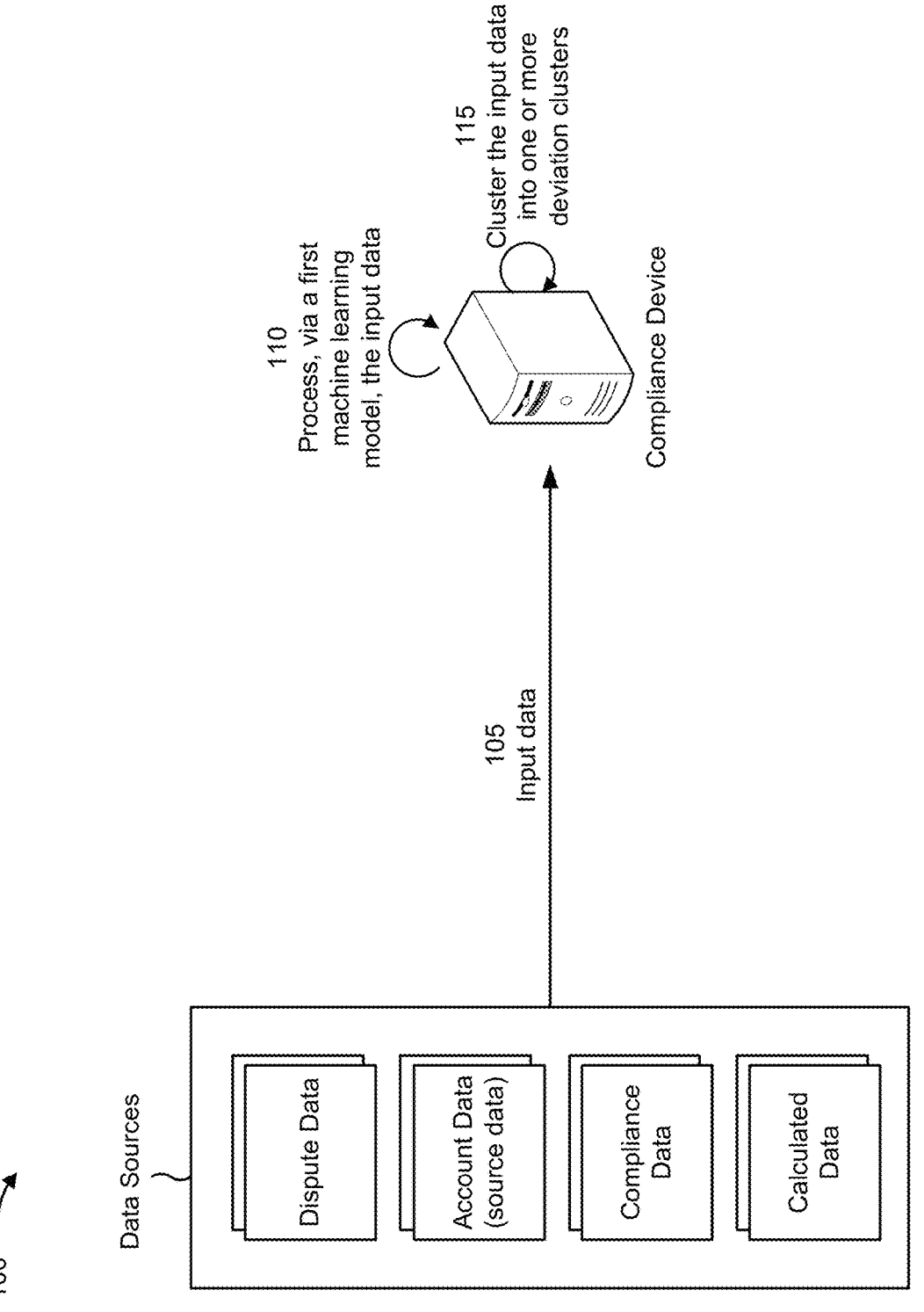
FIGS. 1A-1E are diagrams of an example associated with clustering-based deviation pattern recognition, in accordance with some embodiments of the present disclosure.

The following detailed description of example implementations refers to the accompanying drawings. The same reference numbers in different drawings may identify the same or similar elements.

Vast amounts of data may be stored electronically in data structures (e.g., databases, blockchains, log files, cookies, or the like). A device may perform multiple queries, or other information retrieval techniques, to unrelated data structures to obtain data relevant to a particular task or computational operation. Moreover, each data structure may employ a particular schema and/or use particular data formatting conventions for data storage. Thus, the data may be incompatible and difficult to integrate into machine-usable outputs for computational instructions or automation. This incompatibility may necessitate separate handling of the data using complex instructions and/or repetitive processing to achieve desired computational outcomes or automation outcomes, thereby expending significant computing resources (e.g., processor resources and/or memory resources) and causing significant delays.

In addition, separate use of the data, such as individually presenting the data in a user interface for analysis by a user, may be inefficient. For example, the device may separately process and/or reformat data from different data structures to obtain information for presenting in the user interface, thereby expending significant computing resources. Furthermore, individually presenting the data may increase the size of a user interface (e.g., a web page) or utilize multiple user interfaces (e.g., multiple web pages). Navigating through a large user interface or a large number of user interfaces to find relevant information creates a poor user experience, consumes excessive computing resources that are needed for a client device to generate and display the user interface(s) and that are needed for one or more server devices to serve the user interface(s) to the client device, and consumes excessive network resources that are needed for communications between the client device and the server device.

For example, a device may determine calculated data (e.g., from source data, such as account data) in accordance with compliance data. For example, the compliance data may define one or more compliance rules for calculating the calculated data. The source data, the compliance data, and the calculated data may be associated with unrelated data structures that employ a particular schema and/or use particular data formatting conventions for data storage. Therefore, the device may perform separate handling of the data using complex instructions and/or repetitive processing to achieve desired computational outcomes or automation outcomes (e.g., as defined by the compliance data), thereby expending significant computing resources (e.g., processor resources and/or memory resources) and causing significant delays. Additionally, the device may rely on disputed data (e.g., indicating one or more disputes associated with the calculated data) to identify and/or resolve any issues with the calculated data. For example, the device may provide and/or publish the calculated data to another device or platform. The device may receive disputed data, investigate a given account or calculation indicated by the disputed data, and/or perform one or more operations associated with correcting any issues associated with the given account or calculation. This reactive approach to detecting the issues consumes significant computing resources (e.g., processor resources and/or memory resources) and causes significant delays.

Some implementations described herein enable integration of otherwise incompatible data from multiple unrelated data structures. In some implementations, a system may use a machine learning model to predict deviation patterns associated with calculated data. For example, the machine learning model may determine one or more clusters based on data relating to disputed data, compliance rule data, account data, and/or calculated data. The one or more clusters may be indicative of respective types of deviations from at least one of one or more compliance rules indicated by the compliance rule data or one or more calculation rules. Based on the one or more clusters, the system may determine one or more operations to be performed to mitigate the deviation based on a root cause analysis associated with the deviation. The system may provide, to the machine learning model as feedback, the one or more operations to enable the machine learning model to automatically apply the one or more operations when data is clustered into a given cluster (e.g., in the future).

For example, the system may cluster, based on an output of the machine learning model (e.g., a clustering model), data into a given cluster. The system may perform, based on the data being clustered into the given cluster, one or more operations on the data to generate modified data. The one or more operations may be associated with mitigating a deviation type associated with the cluster (e.g., determined by the system during a training of the machine learning model). The system may transmit, to a server device, the modified data. As a result, the system may detect a deviation pattern for calculated data, correct the deviation, and transmit (e.g., provide or publish) the corrected data automatically without receiving a dispute associated with the data.

In this way, the machine learning model enables the system to perform operations based on otherwise incompatible data while conserving computing resources and reducing delays that would otherwise result from separate handling of the data using complex instructions and/or repetitive processing. Moreover, an output of the machine learning model may convey data from the multiple unrelated databases in a smaller user interface or in a lesser number of user interfaces than otherwise would have been used to individually present data from the multiple unrelated databases (e.g., the one or more operations or a workflow associated with mitigating or correcting a given deviation type of a given cluster may be displayed in a user interface without displaying data from multiple unrelated databases, such as a disputed database, a compliance database, a source database, and/or a calculation database). In this way, the use of computing resources and network resources is reduced in connection with serving, generating, and/or displaying the user interface(s).

FIGS. 1A-1E are diagrams of an example 100 associated with clustering-based deviation pattern recognition. As shown in FIGS. 1A-1E, example 100 includes a compliance device, one or more data sources, a server device, and/or a client device. These devices are described in more detail in connection with FIGS. 3 and 4.

The compliance device may perform one or more operations associated with ensuring that data (e.g., data that is calculated and/or otherwise processed based on source data, such as data from an account) complies with one or more rules (e.g., one or more compliance rules). For example, the compliance device may be associated with ensuring that a migration from a first platform to a second platform is performed successfully (e.g., that the second platform is functioning properly after the first platform is taken offline or no longer used). The compliance device may monitor data calculated, generated, and/or otherwise processed by the second platform to ensure that the second platform is functioning properly (e.g., functioning in a similar manner or at a similar level as the first platform). For example, compliance rule data described herein may be based on one or more rules or one or more parameters of a first platform that are used to ensure that a second platform is functioning properly.

In some implementations, the compliance device may process data at multiple levels to ensure compliance with the one or more rules. For example, the compliance device may obtain input data (e.g., as described in more detail elsewhere herein). The compliance device may perform, via a first platform, one or more calculations using the input data, may generate data based on the input data, and/or may otherwise process to input data to obtain first output data. The first platform may be associated with a first level of processing of the input data. At a second level of processing, the compliance device may provide the input data to a proxy platform. The proxy platform may be configured to simulate a second platform. For example, the proxy platform may include a machine learning model configured to simulate the second platform. The proxy platform may output second output data.

The compliance device may compare the first output data to the second output data. For example, the compliance device may detect one or more deviations or anomalies based on detected differences between the first output data to the second output data. The compliance device may perform one or more operations to correct and/or modify data, from the first output data, that has a significant difference from corresponding data included in the second output data. The compliance device may transmit, to another device (such as the server device) the first output data after correcting any detected deviations or anomalies based on the second output data. This enables the compliance device to ensure that a migration from the second platform to the first platform is functioning properly. Additionally, this conserves computing resources, processing resources, and/or network resources, among other examples, that would have otherwise been used associated with transmitting the first output data (e.g., with one or more deviations or anomalies), receiving an indication of an issue with the first output data (e.g., via one or more disputes), investigating the issue, correcting the issue, and transmitting the corrected data.

Additionally, or alternatively, the compliance device may use a machine learning model that clusters the input data into clusters corresponding to respective deviation types, as described in more detail elsewhere herein. The compliance device may be enabled to automatically perform one or more operations to correct data clustered into a given cluster based on the operation(s) identified to correct a given deviation type.

As shown in FIG. 1A, and by reference number 105, the compliance device may obtain or retrieve input data. The input data may be training data for the machine learning model described herein. The compliance device may obtain or retrieve the input data from the one or more data sources. The input data may include disputed data, compliance rule data, account data, and/or calculated data, among other examples.

The compliance device may obtain the disputed data from a disputed data source. The disputed data may be data that is associated with one or more disputes. For example, the disputed data may be data indicative of the one or more disputes. As an example, the compliance device (or another device) may provide data (e.g., the calculated data) to another device, such as the server device. The other device may be associated with a third party that publishes information based on the calculated data. In some examples, the other device may obtain an indication that a user (e.g., associated with published data) is disputing the published data. In such examples, the other device may transmit, and the compliance device may receive, disputed data indicating information associated with the dispute (e.g., a name of the user, a date of the dispute, a description of the dispute, and/or particular data being disputed). The disputed data may include data indicative of multiple disputes associated with different users and/or different accounts.

The compliance device may obtain the account data from an account data source. The account data may be source data. For example, the account data may be source data used to generate the calculated data. The account data may be obtained via one or more account databases (e.g., associated with storing data for accounts with a given entity). The given entity may be associated with the compliance device.

The compliance device may obtain the compliance data from a compliance data source. The compliance data may indicate one or more compliance rules. As an example, the one or more compliance rules may be rules associated with reporting calculated data to one or more server devices. For example, one or more server devices may be associated with respective agencies. The one or more compliance rules may define how data is to be reported to the respective agencies. As an example, the one or more compliance rules may be credit reporting requirements for reporting data to one or more credit agencies (e.g., one or more credit bureaus).

The compliance device may obtain the calculated data from a calculation data source. The calculated data may be data that is calculated, generated, and/or otherwise processed (e.g., by a system or platform) using source data, such as the account data. For example, the calculated data may be data that is reported to the server device(s). As an example, the calculated data may be credit reporting data that is calculated based on the account data.

As shown by reference number 110, the compliance device may process, using a machine learning model (e.g., a first machine learning model), the input data. For example, the machine learning model may include a clustering model. Clustering is an unsupervised machine learning technique associated with grouping similar data points together into clusters based on features or characteristics of the data. For example, the clustering model may be a K-means model (e.g., associated with partitioning the input data into K clusters, where each data point belongs to the cluster with the nearest mean (centroid)). As another example, the clustering model may be a hierarchical clustering model, a density-based spatial clustering of applications with noise (DBSCAN) model, a mean shift model, a Gaussian mixture model (GMM), a spectral clustering model, an affinity propagation model, an agglomerative clustering model (e.g., with Ward linkage), and/or another type of clustering model.

As shown by reference number 115, the compliance device may cluster (e.g., using the clustering model) the input data into one or more clusters based on the clustering information (e.g., based on the vector quantization information). For example, the compliance device may process the input data to obtain clustering information associated with the input data. The clustering information may include vector quantization information. For example, the compliance device may process the input data to obtain vector quantization information associated with the input data. For example, the compliance device may initialize the input data by selecting K data points from the input data as initial centroids. The K data points may be randomly selected or may be defined (e.g., via a user input) for training the clustering model. As an example, initial centroids may be defined for respective deviation types, as described in more detail elsewhere herein.

The compliance device may assign each data point in the input data to the nearest centroid (e.g., from the K initial centroids) based on a distance metric. The distance metric may be a Euclidean distance or another distance metric. The compliance device may update the centroid for each cluster (e.g., by calculating the mean of the data points assigned to each cluster) to create a new centroid that is closer to the center of each respective cluster. The compliance device may iteratively assign data points to respective clusters followed by updating the centroid for each cluster until a convergence event occurs and/or is detected. The convergence event may include the centroids no longer changing during the updating step a predetermined quantity of iterations being performed, among other examples.

An output of the clustering model may include one or more deviation clusters and data points clustered into respective deviation clusters. The deviation clusters may be associated with respective deviation types. For example, the one or more clusters may be indicative of respective types of deviations from the one or more compliance rules indicated by the compliance rule data and/or one or more calculation rules (e.g., rules for calculating the calculated data).

A deviation type may be associated with a given deviation from one or more compliance rules (e.g., indicated by the compliance data) and/or associated with a deviation associated with a particular type or category of data, among other examples. As an example, a first deviation cluster may be associated with bankruptcy deviations (e.g., data associated with bankruptcies), a second deviation cluster may be associated with accounts past due (e.g., data associated with reports of an account being past due), and/or a third cluster may be associated with disputes in progress, among other examples. Additionally, the clustering model may output an indication of one or more deviations associated with a given cluster. For example, the clustering model may indicate one or more deviation patterns detected from data points included in a given cluster.

Figure 1B:
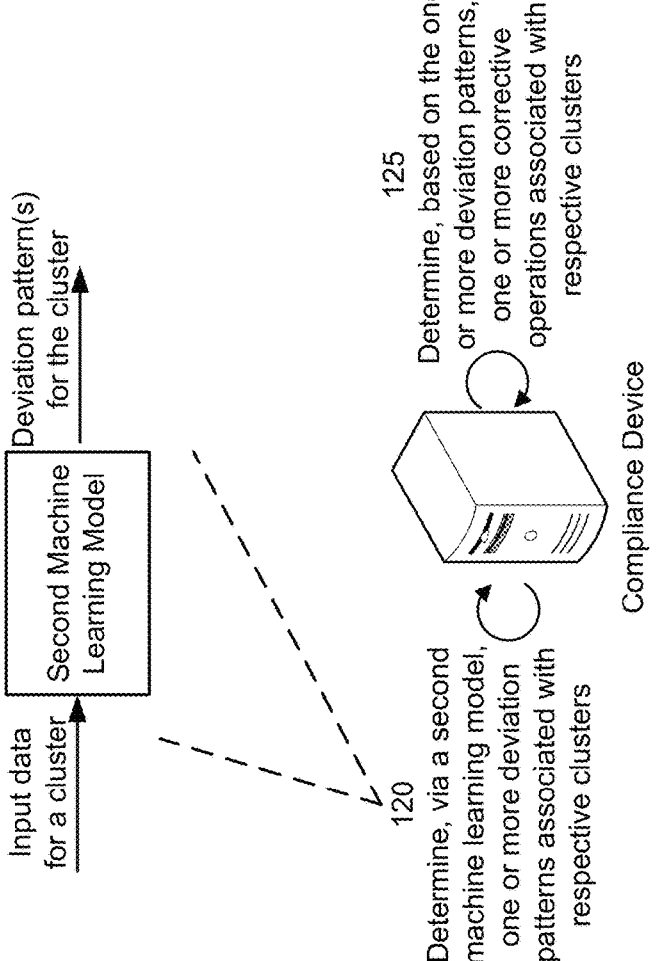
Figure 1B:

As shown in FIG. 1B, and by reference number 120, the compliance device may determine, via a second machine learning model (e.g., another model included in the machine learning model where the clustering model is a first machine learning model), one or more deviation patterns associated with respective clusters. The compliance device may identify one or more deviation patterns associated with a portion of the input data (e.g., data points from the input data) that is included in a cluster of the one or more clusters. The one or more deviation patterns may be based on the portion of the input data (e.g., that is included in the cluster), the compliance data, and/or source data associated with the one or more accounts, among other examples.

For example, for a given cluster, the compliance device may input, to the second machine learning model, data points included in the given cluster. The second machine learning model may be configured to detect one or more patterns of deviations with the data points from the one or more compliance rules and/or the one or more calculation rules, among other examples. A deviation pattern may indicate one or more errors, deviations, and/or miscalculations, among other examples associated with data points included in the given cluster.

For example, the compliance device may obtain, from the portion of the input data (e.g., the data points from the input data included in the given cluster), calculated data and source data associated with the data points. The calculated data may be data that is calculated based on the source data. The compliance device may determine, via the second machine learning model, the one or more deviation patterns based on the calculated data, the source data, and the compliance data.

In some implementations, the compliance device may cluster, based on a second output of the clustering model, additional data (e.g., also referred to herein as third data) into a given cluster. The additional data may include non-disputed data that is similar to the data points initially clustered into the given cluster. In other words, the additional data may be data that was correctly calculated, generated, and/or otherwise processed. The compliance device may determine (e.g., via the second machine learning model), based on the portion of the input data and the additional data, one or more differences between the portion of the first data and the third data. The compliance device (e.g., via the second machine learning model) may identify the one or more deviation patterns based on the one or more differences. In other words, the clustering model may group similar data points together. The second machine learning model (e.g., a pattern recognition model) may be configured to analyze disputed data and non-disputed data from the data points grouped into a given cluster to identify or detect one or more deviation patterns associated with the cluster.

In other words, the second machine learning model may be a pattern recognition model that is configured to detect deviation patterns of data points using inputs from different unrelated databases, such as from the different data sources depicted in FIG. 1A. This enables the compliance device to detect the deviation pattern(s) based on otherwise incompatible data while conserving computing resources and reducing delays that would otherwise result from separate handling of the data using complex instructions and/or repetitive processing.

As shown by reference number 125, the compliance device may determine, based on the one or more deviation patterns, one or more corrective operations associated with respective clusters. For example, the compliance device may determine, for a given cluster, one or more operations (e.g., one or more corrective operations) to be performed to mitigate deviations based on the one or more deviation patterns associated with the given cluster. For example, the compliance device may determine, for a given cluster, one or more operations to be performed to mitigate deviations associated with a deviation type associated with the given cluster based on a root cause analysis associated with the deviation type.

For example, the compliance device may obtain, from the portion of the input data included in the given cluster, first calculated data and source data (e.g., used to calculate or generate the first calculated data). In some implementations, the first calculated data may be included in disputed data associated with one or more accounts. In other words, the first calculated data may be indicated as being associated with one or more deviations (e.g., based on the first calculated being indicated by disputed data). The compliance device may determine second calculated data based on the source data and one or more compliance rule indicated by the compliance data. In other words, the compliance device may perform one or more operations (e.g., indicated by the one or more compliance rules) to re-calculate data based on the identified source data. The compliance device may determine the one or more operations based on one or more differences between the first calculated data and the second calculated data and based on the one or more deviation patterns associated with the given cluster.

For example, the compliance device may determine the one or more operations based on the one or more deviation patterns. A deviation pattern may indicate a type of calculation and/or a type of data that is typically associated with a deviation. The compliance device may determine one or more operations to correct the deviation for the type of calculation and/or the type of data. In some implementations, the compliance device may determine one or more differences between a first process associated with obtaining the portion of the input data (e.g., the calculated data) and a second process associated with obtaining the second calculated data. The compliance device may determine the one or more operations based on the one or more differences between the first process and the second process. For example, the second process may indicate one or more steps, calculations, or other operations that are performed incorrectly as part of the first process. The compliance device may determine the one or more operations to correct the one or more steps, calculations, or other operations. As another example, the second process may indicate one or more steps, calculations, or other operations that were not performed during the first process (e.g., but should have been performed in accordance with the one or more compliance rules). The compliance device may determine the one or more operations to cause the one or more steps, calculations, or other operations (e.g., that were not performed during the first process) to be performed.

In some implementations, the compliance device may cause the one or more operations to be performed for data included in the given cluster (e.g., to generate modified data or corrected data). The compliance device may perform operations described above for each cluster (e.g., to identify one or more operations to be performed to mitigate and/or correct deviation patterns for respective clusters). In some implementations, the compliance device may transmit, and the server device may receive, an indication of modified data (e.g., that is modified based on performing one or more corrective operations, as described above).

Figure 1C:
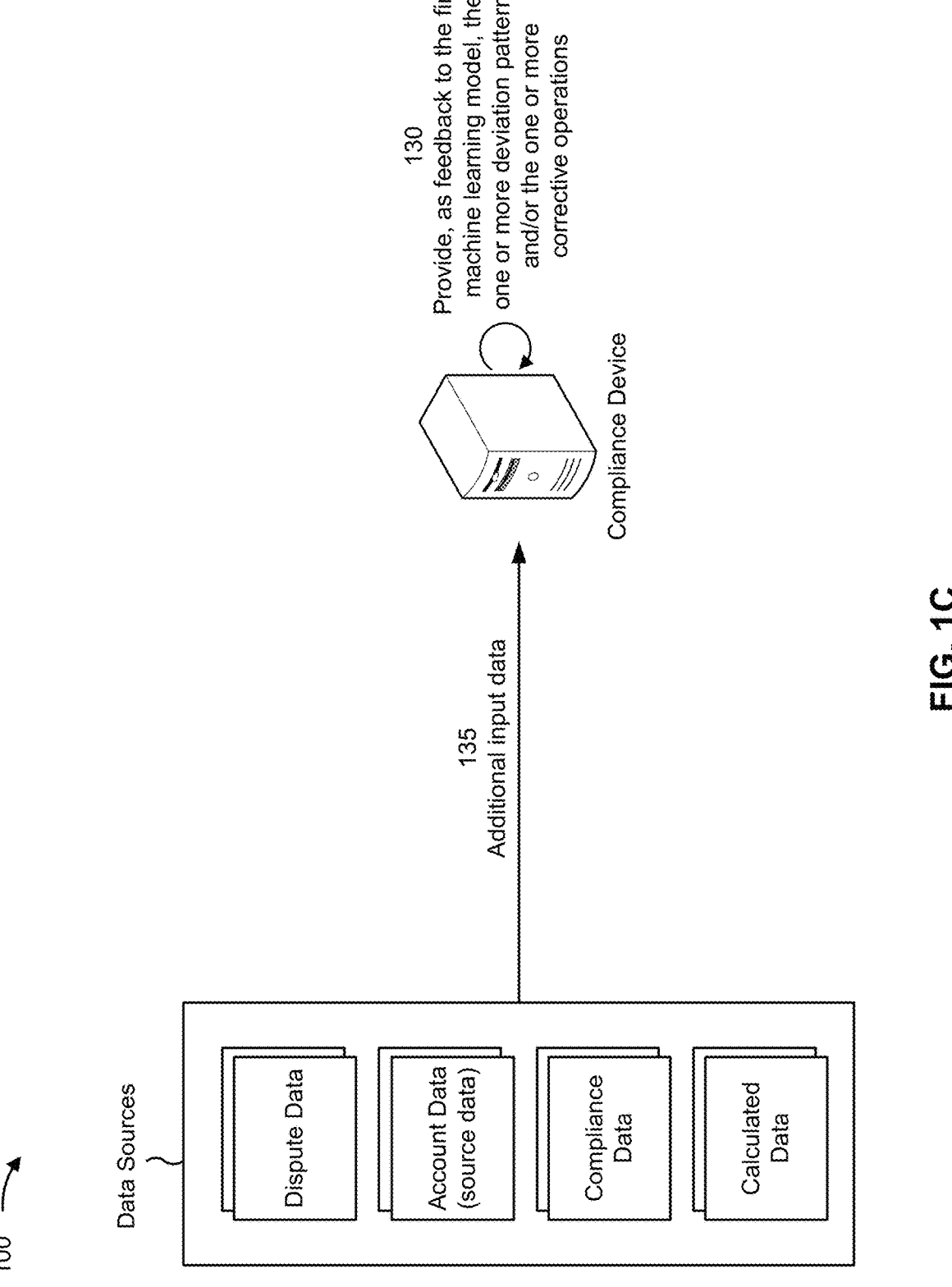

As shown in FIG. 1C, and by reference number 130, the compliance device may provide, as feedback to the first machine learning model (e.g., the clustering model), the one or more deviation patterns and/or the one or more corrective operations associated with respective clusters. For example, in some implementations, the compliance device may provide, as feedback to the clustering model, an indication of the one or more operations (e.g., the one or more corrective operations) determined for a given cluster.

In some implementations, the clustering model may be re-trained using feedback information. For example, feedback may be provided to the clustering model. The feedback may be associated with actions performed based on the recommendations provided by the clustering model and/or automated actions performed, or caused, by the clustering model. In other words, the information output by the clustering model may be used as inputs to re-train the clustering model (e.g., a feedback loop may be used to train and/or update the machine learning model). For example, the feedback information may include the one or more operations determined to mitigate and/or correct deviation patterns for a given cluster (e.g., deviation patterns indicated by the clustering model or another machine learning model, as described elsewhere herein). In this way, the clustering model may be trained to automatically recognize the corrective operation(s) to be performed for data grouped into a given cluster. The clustering model may be re-trained to recommend the corrective operation(s) to be performed and/or to automatically cause the corrective operation(s) to be performed.

The compliance device may deploy a trained machine learning model. The trained machine learning model may include the trained clustering model and/or a trained deviation pattern recognition model. For example, the trained clustering model may be trained to cluster input data into a given cluster and recommend and/or automatically perform one or more corrective operations for a deviation type and/or a deviation pattern associated with the given cluster, as described in more detail elsewhere herein.

As shown by reference number 135, the compliance device may obtain additional input data. For example, after the trained machine learning model is deployed, the compliance device may obtain additional input data (e.g., second input data). The additional input data may be similar to the input data described in connection with FIG. 1A. However, the additional input data may not be historical data and/or training data. Rather, the compliance device may use the trained machine learning model to detect and/or correct one or more deviations for data points included in the additional input data.

Figure 1D:
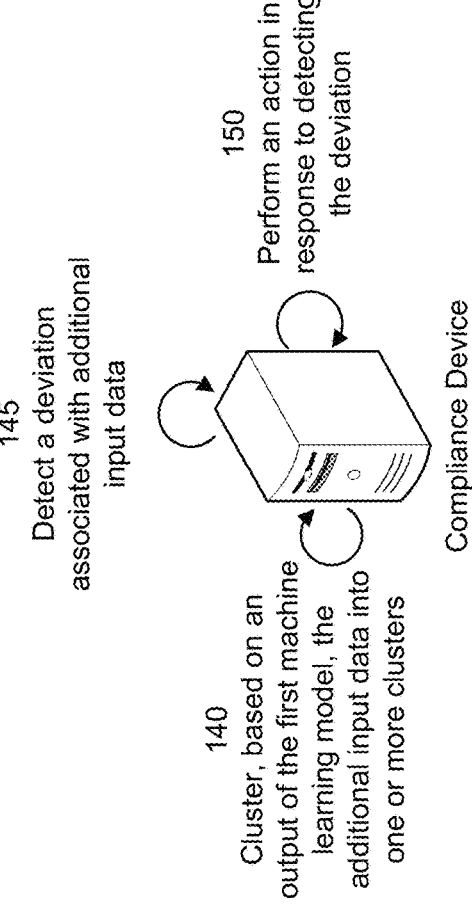

For example, as shown in FIG. 1D, and by reference number 140, the compliance device may cluster, based on an output of the first machine learning model (e.g., the trained clustering model), the additional input data into one or more clusters. For example, the compliance device may provide the additional input data as an input to the deployed machine learning model. The clustering model may group data points from the additional input data into respective clusters (e.g., clusters that are determined based on the training performed for the clustering model, as described above). As an example, one or more data points from the additional input data may be grouped into a cluster that is associated with a deviation type and/or a deviation pattern (e.g., from the one or more compliance rules and/or the one or more calculation rules).

As shown by reference number 145, the compliance device may detect a deviation associated with the additional input data. For example, the compliance device may detect a deviation associated with one or more data points based on the one or more data points being clustered into a given cluster (e.g., where the cluster is associated with the deviation or a deviation pattern indicative of the deviation). For example, the output of the clustering model may be indicative of whether a given data input is associated with a deviation from one or more rules (e.g., one or more compliance rules or calculation rules) associated with calculating, generating, and/or otherwise processing the given data input.

As shown by reference number 150, the compliance device may perform an action in response to detecting the deviation. For example, the compliance device may refrain, based on detecting the deviation, from transmitting, to the server device, the data associated with the deviation. In other words, if a deviation is detected, the compliance device may not provide or report the data associated with the deviation.

Figure 1E:
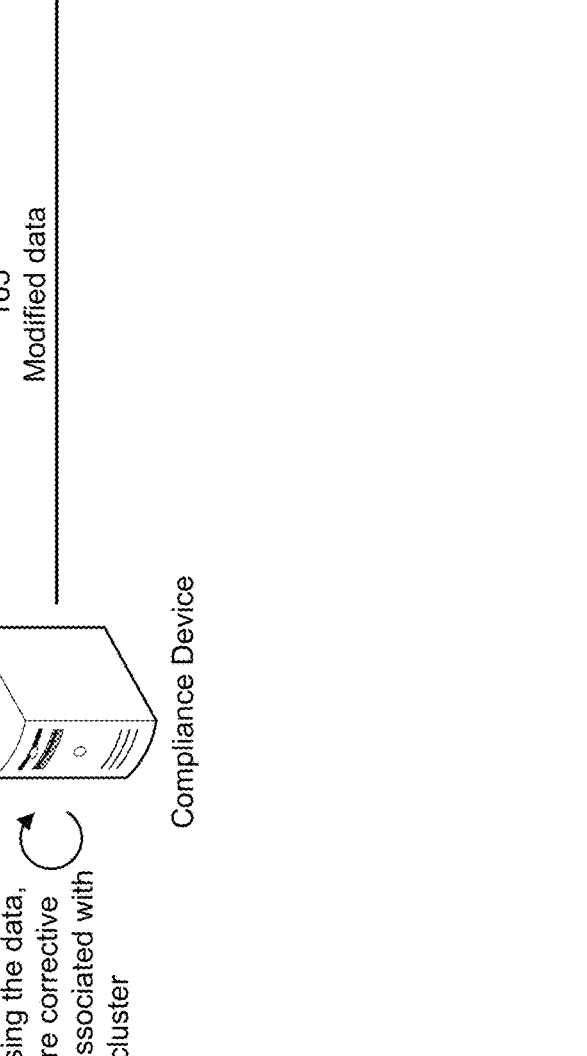

Additionally, as shown in FIG. 1E, and by reference number 155, the compliance device may perform, using data clustered into the given cluster, one or more corrective operations associated with the given cluster. For example, the compliance device may perform, based on data being clustered into the given cluster, the one or more operations on the data to generate modified data. In other words, the compliance device may be configured to automatically perform one or more corrective operations (e.g., designed to mitigate or correct a deviation type or deviation pattern associated with the given cluster) to data from the additional input data that is grouped into the given cluster. For example, the compliance device may generate modified data based on the data from the additional input data that is grouped into the given cluster. The modified data may be data that is calculated, generated, and/or otherwise processed properly in accordance with the compliance data.

Additionally, or alternatively, as shown by reference number 160, the compliance device may transmit, and the client device may receive, a notification of the deviation. The notification of the deviation may indicate data from the additional input data that is associated with the deviation (e.g., that is grouped into the cluster). Additionally, or alternatively, the notification may indicate a deviation type and/or deviation pattern associated with the deviation (e.g., where the deviation type and/or deviation pattern is indicated by the cluster). Additionally, or alternatively, the notification may indicate one or more corrective operations to be performed to correct or mitigate the deviation. For example, the one or more corrective operations may be indicated by an output of the machine learning model (e.g., the clustering model) based on the given cluster in which the data is grouped.

Additionally, or alternatively, as shown by reference number 165, the compliance device may transmit, and the server device may receive, the modified data. For example, the compliance device may generate modified data based on the data from the additional input data that is grouped into the given cluster. The modified data may be data that is calculated, generated, and/or otherwise processed properly in accordance with the compliance data. The compliance device may be configured to transmit and/or report data (e.g., calculated data) that is grouped into a cluster associated with a deviation or deviation type only after the one or more corrective operations (e.g., that are associated with the cluster) are performed on the data. This conserves time, processing resources, computing resources, and/or network resources, among other examples, that would have otherwise been used to transmit or report data associated with a deviation, receive an indication of a dispute associated with the data, investigate the dispute, perform one or more corrective actions, and then transmit the modified data.

As indicated above, FIGS. 1A-1E are provided as an example. Other examples may differ from what is described with regard to FIGS. 1A-1E.

Figure 2:
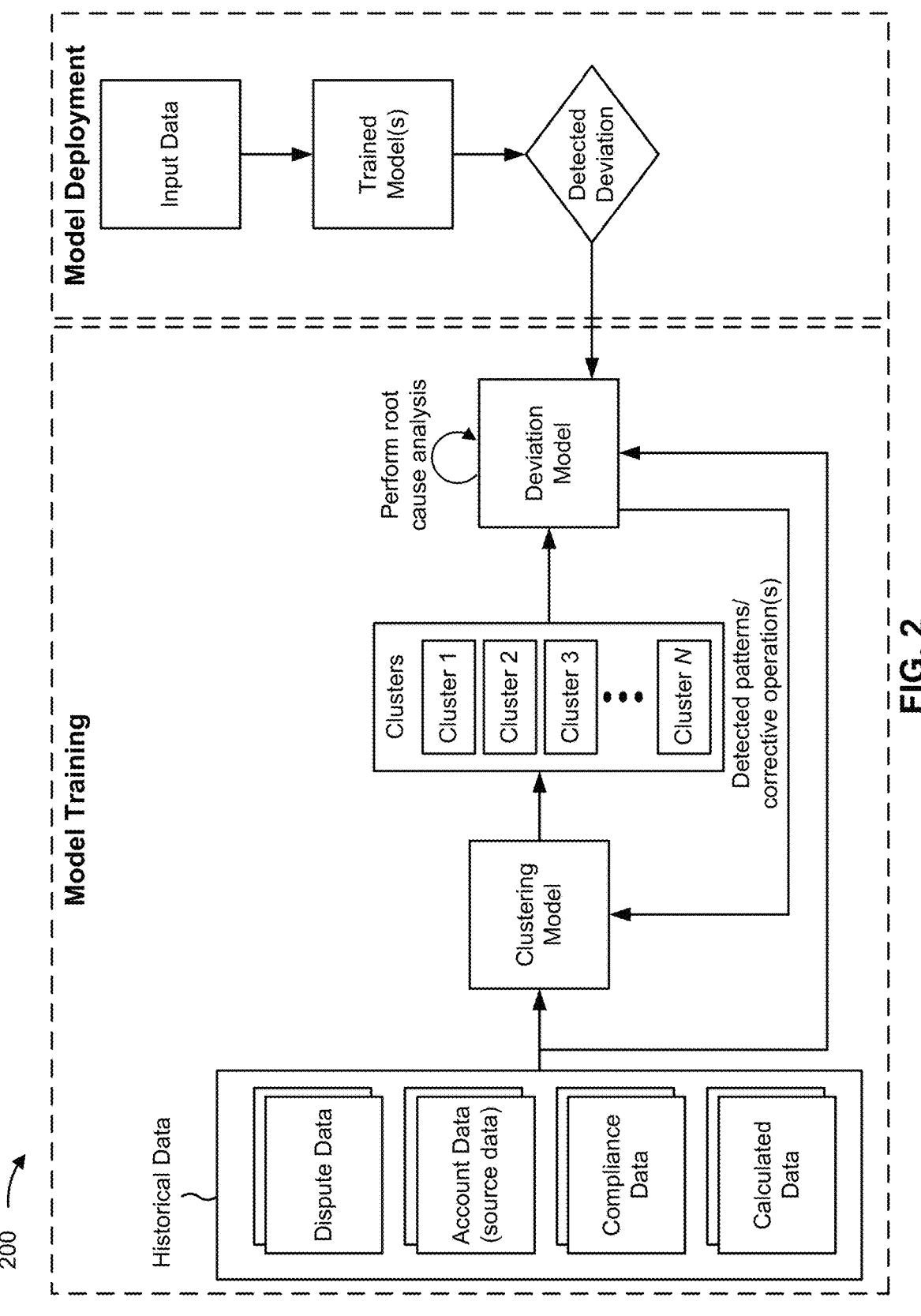
FIG. 2 is a diagram of an example associated with training and using a machine learning model for clustering-based deviation pattern recognition, in accordance with some embodiments of the present disclosure.

FIG. 2 is a diagram of an example 200 associated with training and using a machine learning model for clustering-based deviation pattern recognition.

As shown in FIG. 2, a machine learning model may be associated with model training (e.g., in which a machine learning model is trained to perform one or more operations described herein) and a model deployment (e.g., in which the trained machine learning model performs the one or more operations described herein). In some implementations, operations depicted and/or described associated with the model training may be performed via a first one or more devices and operations depicted and/or described associated with the model deployment may be performed via a second one or more devices. In other implementations, operations depicted and/or described associated with the model training and operations depicted and/or described associated with the model deployment may be performed via at least one common device (e.g., the compliance device).

The machine learning model may include a clustering model (also referred to as a first machine learning model elsewhere herein) and a deviation model (also referred to as a second machine learning model elsewhere herein). The clustering model may be configured to cluster data points into clusters associated with respective deviation types, as described in more detail elsewhere herein. The deviation model may be configured to detect and/or determine one or more deviation patterns and/or one or more corrective operations based on data points included in a given cluster.

For example, the clustering model may be trained using historical data. The historical data may be similar to the input data described in connection with FIG. 1A. The clustering model may be trained to cluster data points (e.g., from the historical data) into clusters (shown as clusters 1 through N) associated with respective deviation types. As shown in FIG. 2, the clusters and/or data points may be provided to the deviation model. Additionally, at least a portion (or all) of the historical data may be provided to the deviation model. The deviation model may perform root cause analysis for data points in each cluster to determine one or more deviation patterns for a given cluster. Additionally, or alternatively, the deviation model may perform root cause analysis for data points in each cluster to determine one or more corrective operations to be performed to correct or mitigate deviation patterns associated with respective clusters. Root cause analysis is a systematic and methodical approach used to identify the underlying or fundamental causes of a problem, incident, or failure in a process, system, and/or product, among other examples. For example, the deviation model may be trained to detect the deviation patterns and/or corrective operations based on the underlying or fundamental causes of a deviation associated with data inputs in a given cluster.

The deviation model may provide, as feedback information, an indication of deviation patterns and/or corrective operations for respective clusters associated with the clustering model. This may enable the clustering model to detect the deviation patterns and/or recommend or automatically perform the corrective operations in response to a data point being grouped into a given cluster (e.g., by the clustering model). The machine learning model may perform one or more training iterations (e.g., of grouping historical data into clusters, performing root cause analysis, and feeding back deviation patterns and/or corrective operations for respective clusters) until a convergence event is detected. The convergence event may include a quantity of training iterations performed satisfying an iteration threshold and/or another convergence event.

As shown in FIG. 2, the trained machine learning model (e.g., including the clustering model and/or the deviation model) may be deployed. For example, input data (e.g., similar to input data described elsewhere herein) may be provided to the trained machine learning model. The trained machine learning model may output an indication of one or more data points associated with a deviation and/or a recommendation of one or more corrective operations to be performed to correct or mitigate the deviation. Additionally, or alternatively, the trained machine learning model may automatically perform the one or more corrective operations to generate modified data, as described in more detail elsewhere herein. As shown in FIG. 2, any detected deviations that are indicated by the trained machine learning model may be provided (e.g., to the deviation model) as feedback information. The trained machine learning model may be re-trained (e.g., in a feedback loop) using the detected deviations to improve a performance of the machine learning model.

As indicated above, FIG. 2 is provided as an example. Other examples may differ from what is described with regard to FIG. 2.

Figure 3:
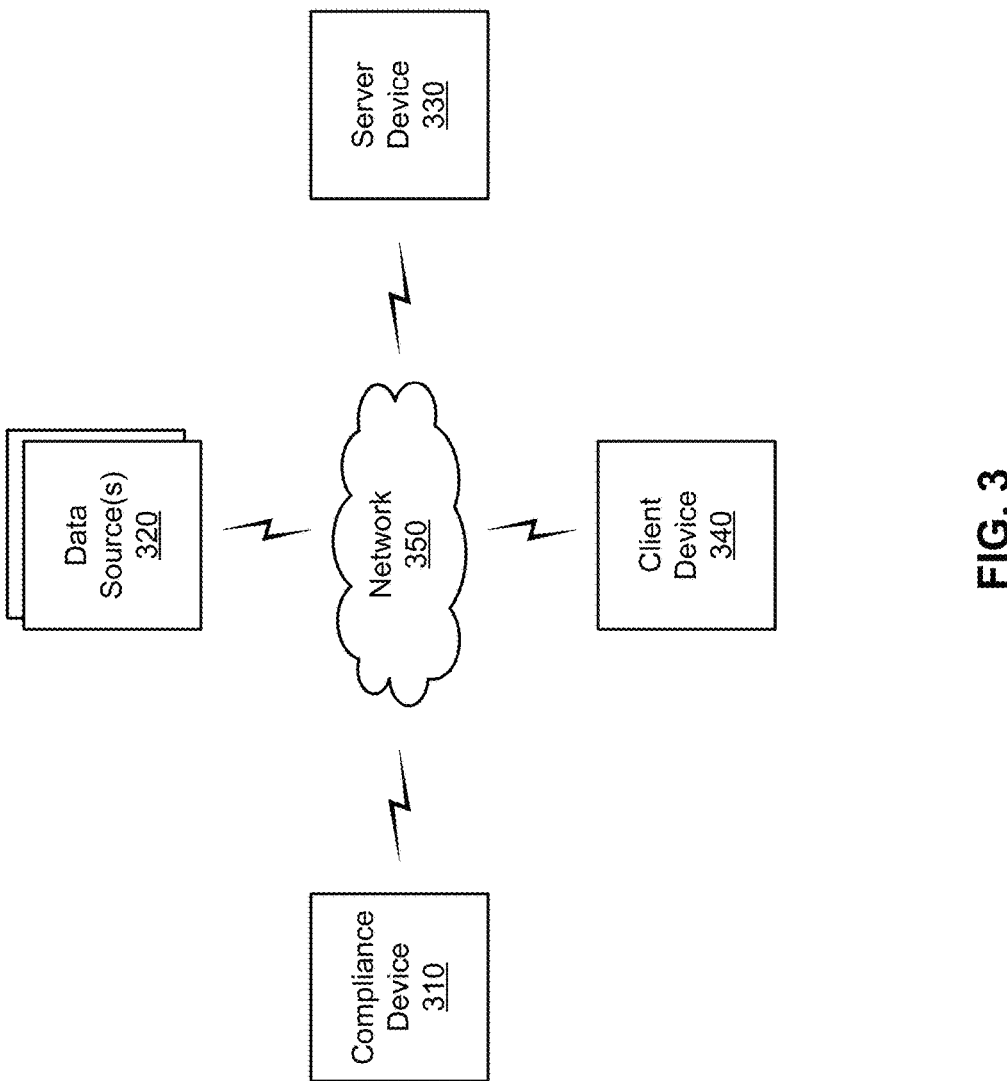
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a compliance device 310, one or more data sources 320, a server device 330, a client device 340, and a network 350. Devices of environment 300 may interconnect via wired connections, wireless connections, or a combination of wired and wireless connections.

The compliance device 310 may include one or more devices capable of receiving, generating, storing, processing, providing, and/or routing information associated with clustering-based deviation pattern recognition, as described elsewhere herein. The compliance device 310 may include a communication device and/or a computing device. For example, the compliance device 310 may include a server, such as an application server, a client server, a web server, a database server, a host server, a proxy server, a virtual server (e.g., executing on computing hardware), or a server in a cloud computing system. In some implementations, the compliance device 310 may include computing hardware used in a cloud computing environment.

A data source 320 may include one or more devices capable of receiving, generating, storing, processing, and/or providing information associated with clustering-based deviation pattern recognition, as described elsewhere herein. The data source 320 may include a communication device and/or a computing device. For example, the data source 320 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 320 may communicate with one or more other devices of environment 300, as described elsewhere herein.

The server device 330 may include one or more devices capable of receiving, generating, storing, processing, providing, and/or routing information associated with clustering-based deviation pattern recognition, as described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 may include computing hardware used in a cloud computing environment.

The client device 340 may include one or more devices capable of receiving, generating, storing, processing, and/or providing information associated with clustering-based deviation pattern recognition, as described elsewhere herein. The client device 340 may include a communication device and/or a computing device. For example, the client device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 350 may include one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
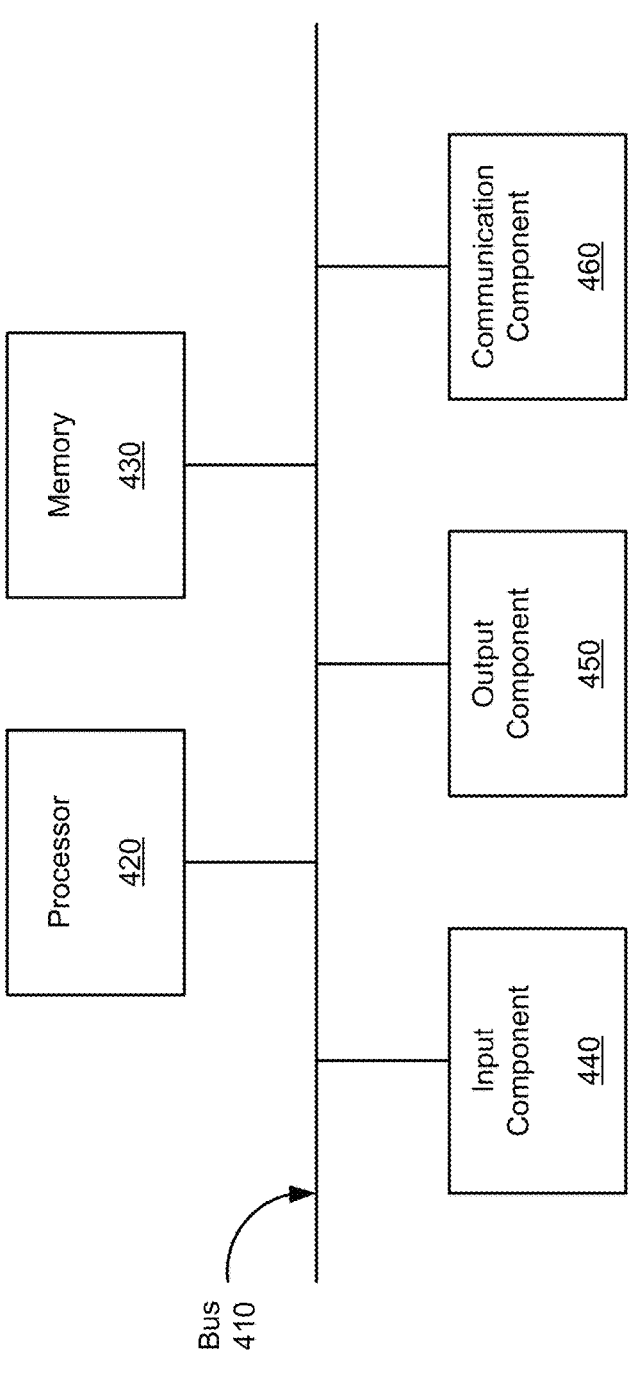
FIG. 4 is a diagram of example components of a device associated with clustering-based deviation pattern recognition, in accordance with some embodiments of the present disclosure.

FIG. 4 is a diagram of example components of a device 400 associated with clustering-based deviation pattern recognition. The device 400 may correspond to the compliance device 310, one or more data sources 320, the server device 330, and/or the client device 340. In some implementations, the compliance device 310, one or more data sources 320, the server device 330, and/or the client device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with clustering-based deviation pattern recognition. In some implementations, one or more process blocks of FIG. 5 may be performed by the compliance device 310. In some implementations, one or more process blocks of FIG. 5 may be performed by another device or a group of devices separate from or including the compliance device 310, such as the one or more data sources 320, the server device 330, and/or the client device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining first data associated with one or more accounts (block 510). For example, the compliance device 310 (e.g., using processor 420 and/or memory 430) may obtain first data associated with one or more accounts, as described above in connection with reference number 105 of FIG. 1A. As an example, the first data may be the input and/or the historical data described elsewhere herein.

As further shown in FIG. 5, process 500 may include processing the first data to obtain clustering information associated with the first data (block 520). For example, the compliance device 310 (e.g., using processor 420 and/or memory 430) may process the first data to obtain clustering information associated with the first data, as described above in connection with reference number 110 of FIG. 1A. As an example, the clustering information may include distances for respective data points from centroids of one or more clusters. The one or more clusters may be associated with respective deviation types and/or deviation patterns.

As further shown in FIG. 5, process 500 may include clustering the first data into one or more clusters based on the clustering information (block 530). For example, the compliance device 310 (e.g., using processor 420 and/or memory 430) may cluster the first data into one or more clusters based on the clustering information, as described above in connection with reference number 115 of FIG. 1A. As an example, the one or more clusters associated with respective types of deviations from one or more compliance rules indicated by compliance data.

As further shown in FIG. 5, process 500 may include identifying, via a second machine learning model, one or more deviation patterns associated with a portion of the first data that is included in a cluster of the one or more clusters (block 540). For example, the compliance device 310 (e.g., using processor 420 and/or memory 430) may identify, via a second machine learning model, one or more deviation patterns associated with a portion of the first data that is included in a cluster of the one or more clusters, as described above in connection with reference number 120 of FIG. 1B. As an example, the one or more deviation patterns are based on the portion of the first data, the compliance data, and source data associated with the one or more accounts.

As further shown in FIG. 5, process 500 may include determining, for the cluster, one or more operations to be performed to mitigate deviations based on the one or more deviation patterns (block 550). For example, the compliance device 310 (e.g., using processor 420 and/or memory 430) may determine, for the cluster, one or more operations to be performed to mitigate deviations based on the one or more deviation patterns, as described above in connection with reference number 125 of FIG. 1B. As an example, the one or more operations may be the corrective operations described elsewhere herein (e.g., associated with correcting and/or mitigating deviations indicated by a deviation pattern).

As further shown in FIG. 5, process 500 may include performing an action, that is based on the one or more operations, associated with second data grouped into the cluster (block 560). For example, the compliance device 310 (e.g., using processor 420 and/or memory 430) may perform an action, that is based on the one or more operations, associated with second data grouped into the cluster, as described above in connection with reference number 150 of FIG. 1D, reference number 155 of FIG. 1E, reference number 160 of FIG. 1E, and/or reference number 165 of FIG. 1E. As an example, the compliance device 310 may detect a deviation based on the second data being grouped into the cluster. The compliance device 310 may perform the one or more operations (e.g., one or more corrective operations) associated with the cluster based on, or in response to, the second data being grouped into the cluster (e.g., to generate modified second data). The compliance device 310 may transmit (e.g., to the server device 330) the modified second data. For example, the modified second data may be in place of the second data in a report transmitted to the server device 330.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for clustering-based deviation pattern recognition, the system comprising:

one or more memories; and one or more processors, communicatively coupled to the one or more memories, configured to:

obtain first data associated with one or more accounts, wherein the first data includes at least one of disputed data, compliance rule data, account data, or calculated data;

process, using a clustering machine learning model, the first data to obtain vector quantization information associated with the first data;

cluster, using the clustering machine learning model, the first data into one or more clusters based on the vector quantization information, wherein the one or more clusters are indicative of respective types of deviations from at least one of one or more compliance rules indicated by the compliance rule data or one or more calculation rules, wherein the one or more compliance rules define how the first data is to be reported to a credit reporting agency;

determine, using a pattern recognition machine learning model, for a cluster of the one or more clusters, one or more corrective operations to be performed to mitigate a deviation type associated with the cluster based on a root cause analysis associated with the deviation type, wherein data from two or more different data sources that utilize two or more different data formatting conventions is input to the pattern recognition machine learning model, wherein the first data includes the data from the two or more different data sources;

cluster, based on a first output of the clustering machine learning model, second data into the cluster, wherein the first output of the clustering machine learning model is provided by a lesser quantity of user interfaces than a quantity of user interfaces for individually presenting the data from the two or more different data sources;

perform, by the pattern recognition machine learning model and based on the second data being clustered into the cluster, the one or more corrective operations on the second data to generate modified second data; and transmit, to a server device of the credit reporting agency, the modified second data, wherein the modified second data is in accordance with the one or more compliance rules.

2. The system of claim 1, wherein a portion of the first data is clustered in the cluster, and wherein the one or more processors, to determine the one or more corrective operations, are configured to:

obtain, from the portion of the first data, first calculated data and source data, wherein the calculated data is calculated based on the source data;

determine, using the pattern recognition machine learning model, one or more deviation patterns based on the first calculated data, the source data, and the compliance rule data; and determine the one or more corrective operations based on the one or more deviation patterns.

3. The system of claim 1, wherein a portion of the first data is clustered in the cluster, and wherein the one or more processors, to determine the one or more corrective operations, are configured to:

cluster, based on a second output of the clustering machine learning model, third data into the cluster, wherein the third data includes non-disputed data;

determine, based on the portion of the first data and the third data, one or more differences between a first process associated with obtaining the portion of the first data and a second process associated with obtaining the third data; and determine the one or more corrective operations based on the one or more differences between the first process and the second process.

4. The system of claim 1, wherein a portion of the first data is clustered in the cluster, and wherein the one or more processors, to determine the one or more corrective operations, are configured to:

obtain, from the portion of the first data, first calculated data and source data, wherein the calculated data is calculated based on the source data;

determine second calculated data based on the source data and at least one compliance rule from the one or more compliance rules; and determine the one or more corrective operations based on one or more differences between the first calculated data and the second calculated data.

5. The system of claim 4, wherein the second calculated data is included in the modified second data in place of the first calculated data.

6. The system of claim 4, wherein the first calculated data is included in the disputed data, and wherein the disputed data is generated based on one or more account disputes.

7. The system of claim 1, wherein the one or more processors are further configured to:

detect a deviation associated with the second data based on the second data being clustered into the cluster; and refrain, based on detecting the deviation, from transmitting, to the server device, the second data.

8. The system of claim 1, wherein the first data is output via a first platform, and wherein the compliance rule data is based on one or more rules or one or more parameters of a second platform.

9. A method for clustering-based deviation pattern recognition, comprising:

obtaining, by a device, first data associated with one or more accounts;

processing, by the device via a clustering machine learning model, the first data to obtain clustering information associated with the first data;

clustering, by the device and via the clustering machine learning model, the first data into one or more clusters based on the clustering information, wherein the one or more clusters associated with respective types of deviations from one or more compliance rules indicated by compliance data, wherein the one or more compliance rules define how the first data is to be reported to a credit reporting agency;

identifying, by the device and via a pattern recognition machine learning model, one or more deviation patterns associated with a portion of the first data that is included in a cluster of the one or more clusters, wherein the one or more deviation patterns are based on the portion of the first data, the compliance data, and source data associated with the one or more accounts, and wherein data from two or more different data sources that utilize two or more different data formatting conventions is input to the pattern recognition machine learning model, wherein the first data includes the data from the two or more different data sources;

clustering, based on an output of the clustering machine learning model, second data into the cluster, wherein the output of the clustering machine learning model is provided by a lesser quantity of user interfaces than a quantity of user interfaces for individually presenting the data from the two or more different data sources;

determining, by the device and for the cluster, one or more corrective operations to be performed to mitigate the deviations based on the one or more deviation patterns;

performing, by the device, an action, that is based on the one or more corrective operations, associated with the second data; and transmitting, by the device and to a device of the credit reporting agency, modified second data, wherein the modified second data is in accordance with the one or more compliance rules.

10. The method of claim 9, wherein performing the action comprises:

performing, based on the second data being clustered into the cluster, the one or more corrective operations on the second data to generate the modified second data.

11. The method of claim 9, wherein identifying the one or more deviation patterns comprises:

obtaining, from the portion of the first data, calculated data and the source data, wherein the calculated data is calculated based on the source data; and determining, using the pattern recognition machine learning model, the one or more deviation patterns based on the calculated data, the source data, and the compliance data.

12. The method of claim 9, wherein identifying the one or more deviation patterns comprises:

clustering, based on a second output of the clustering machine learning model, third data into the cluster, wherein the third data includes non-disputed data;

determining, based on the portion of the first data and the third data, one or more differences between the portion of the first data and the third data; and identifying the one or more deviation patterns based on the one or more differences.

13. The method of claim 9, wherein determining the one or more corrective operations comprises:

obtaining, from the portion of the first data, first calculated data and the source data;

determining second calculated data based on the source data and at least one compliance rule from the one or more compliance rules; and determining the one or more corrective operations based on one or more differences between the first calculated data and the second calculated data and based on the one or more deviation patterns.

14. The method of claim 13, wherein the first calculated data is included in disputed data associated with at least one account from the one or more accounts.

15. The method of claim 9, further comprising:

detecting a deviation associated with the second data based on the second data being clustered into the cluster; and refraining from transmitting, based on detecting the deviation, the second data.

16. A non-transitory computer-readable medium storing a set of instructions, the set of instructions comprising:

one or more instructions that, when executed by one or more processors of a device, cause the device to:

obtain first data associated with one or more accounts, wherein the first data includes at least one of disputed data, compliance rule data, account data, or calculated data;

process, using a clustering machine learning model, the first data to obtain vector quantization information associated with the first data;

cluster, using the clustering machine learning model, the first data into one or more clusters based on the vector quantization information, wherein the one or more clusters are indicative of respective types of deviations from at least one of one or more compliance rules indicated by the compliance rule data or one or more calculation rules, wherein the one or more compliance rules define how the first data is to be reported to a credit reporting agency;

determine, using a pattern recognition machine learning model, for a cluster of the one or more clusters, one or more corrective operations to be performed to mitigate a deviation based on a root cause analysis associated with the deviation, wherein data from two or more different data sources that utilize two or more different data formatting conventions is input to the pattern recognition machine learning model, wherein the first data includes the data from the two or more different data sources;

cluster, based on a first output of the clustering machine learning model, second data into the cluster, wherein the first output of the clustering machine learning model is provided by a lesser quantity of user interfaces than a quantity of user interfaces for individually presenting the data from the two or more different data sources;

perform, based on the second data being clustered into the cluster, the one or more corrective operations to the second data to generate modified second data; and transmit, to a server device of the credit reporting agency, the modified second data, wherein the modified second data is in accordance with the one or more compliance rules.

17. The non-transitory computer-readable medium of claim 16, wherein a portion of the first data is clustered in the cluster, and wherein the one or more processors, to determine the one or more corrective operations, are configured to:

obtain, from the portion of the first data, first calculated data and source data, wherein the calculated data is calculated based on the source data;

determine, using the pattern recognition machine learning model, one or more deviation patterns based on the first calculated data, the source data, and the compliance rule data; and determine the one or more corrective operations based on the one or more deviation patterns.

18. The non-transitory computer-readable medium of claim 16, wherein a portion of the first data is clustered in the cluster, and wherein the one or more processors, to determine the one or more corrective operations, are configured to:

cluster, based on a second output of the clustering machine learning model, third data into the cluster, wherein the third data includes non-disputed data;

determine, based on the portion of the first data and the third data, one or more differences between a first process associated with obtaining the portion of the first data and a second process associated with obtaining the third data; and determine the one or more corrective operations based on the one or more differences between the first process and the second process.

19. The non-transitory computer-readable medium of claim 16, wherein a portion of the first data is clustered in the cluster, and wherein the one or more processors, to determine the one or more corrective operations, are configured to:

obtain, from the portion of the first data, first calculated data and source data, wherein the calculated data is calculated based on the source data;

determine second calculated data based on the source data and at least one compliance rule from the one or more compliance rules; and determine the one or more corrective operations based on one or more differences between the first calculated data and the second calculated data.

20. The non-transitory computer-readable medium of claim 16, wherein the one or more instructions further cause the device to:

detect a deviation associated with the second data based on the second data being clustered into the cluster; and refrain, based on detecting the deviation associated with the second data, from transmitting, to the server device, the second data.

* * * * *